United States Patent Office 2,836,588
Patented May 27, 1958

2,836,588

PIGMENT AND COMPOSITIONS THEREOF

Robert E. Fearon, Tulsa, Okla., assignor to Electro Chemical Laboratories Corporation, Tulsa, Okla., a corporation of Delaware No Drawing. Application April 29, 1953
Serial No. 352,039

14 Claims. (Cl. 260—149)

This invention relates to new compositions of matter and to the use of such compositions in the preparation of inks possessing novel and very desirable properties. More particularly, the present invention concerns a novel type of ink in which the principal pigment compound thereof is an azo derivative having the probable structural formula:

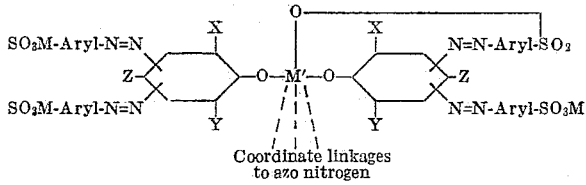

in which Aryl may be phenyl or naphthyl, X represents —OH or H, M is $NH_4$, substituted $NH_4$ or an alkali metal, M' is a metal of the iron family, Y may be —OH or —COOM" and Z is either H or —COOM" wherein M" in the case of both Y and Z represents H or an alkali metal. Compositions coming within the scope of the above chemical formula include:

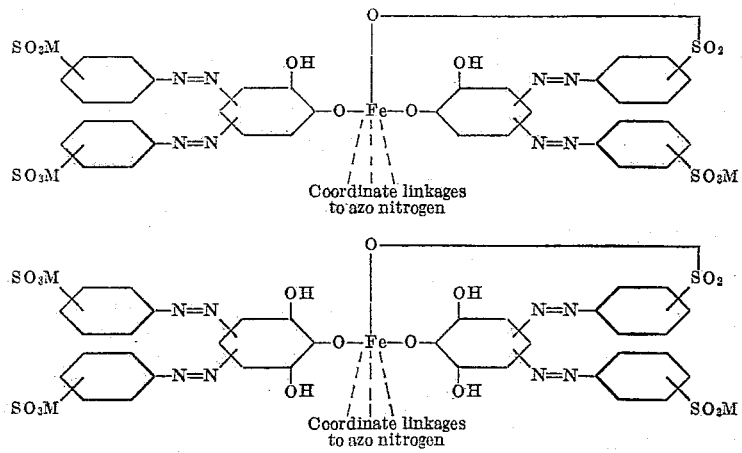

where M may be $NH_4$ or an alkali metal.

Truly black, light and airfast pigments are very rare in nature. Heretofore, chemists and manufacturers have generally made one of two choices in the manufacture of ink; they have either made a mixture of pigments, none of which is black separately, or they have used carbon to obtain the desired color. In the heterogeneous inks the tint usually changes with age and the ink will not remain black indefinitely. This results from the fact that one of the pigments usually fades faster under light or oxidation. One of the present day inks made from a mixture of pigments consists of separable blue and orange dyestuffs; therefore, it will turn blue or orange with age.

An ink utilizing a very fine and dilute suspension of carbon has been made by others. This type of ink will not soon clog fountain pens, but lacks the blackness desired of a drawing ink because it is impractical to maintain the desired carbon content in the ink. Even with the use of this ink, however, clogging will eventually occur, and a difficult cleaning operation becomes necessary.

The present invention contemplates an ink utilizing a black pigment which is homogeneous and extremely soluble in water. The homogeneous black pigment generally resembles the ferroso-ferric tannate blacks of blue-black ink, except in water solubility. The contemplated class of pigments are opaque and print excellently, as is required of drawing ink. The black pigments also are readily susceptible of alteration through the use of ink eradicators, permitting new lines to be drawn over the eradicated area—after a brief period of drying—without blotting of the newly-applied ink. This ready removability of the ink pigment avoids the costly and paper-destroying erasures resulting from the correction of mistakes when using carbon-type inks.

An important object of the present invention is to provide a method of manufacture for a homogeneous black, brown or sepia ink especially adapted for contact printing.

Another object of this invention is to provide a method of manufacture for various other colors of ink which are chromatographically homogeneous and especially adapted for contact printing.

A further object of this invention is to provide a method of manufacture of a pure water-soluble dyestuff containing an organic portion and a metal ion such as iron or cobalt. I also contemplate a method of manufacture of an azo coupled polyhydric phenol capable of reacting with these metal ions to form coordination complexes. It is another object to provide such a method wherein the azo coupled groups attached to the polyhydric phenol have sulfonic acid groups attached to them to maintain water-solubility of the coordination complexes.

Another object of this invention is to provide a method of isolating the water-soluble coordination complex recited in the previous object.

A further object of this invention is to provide compositions and solutions containing these coordination complexes in which the surface tension and wetting characteristics render the solution useful as ink on the common business paper and tracing materials.

A still further object of this invention is to provide ink compositions having a minimum tendency to clog fountain pens and the like. It is also an object to provide such ink compositions wherein the black dyestuff has a strong stabilizing influence on the block colloidal materials suspended therein.

Another important object of this invention is to provide an ink for book publishing and the like wherein the pigment can be removed from the fibers by reagents which are non-destructive to the fibers, thereby allowing the pulp to be returned to a higher grade of service than is now possible where carbon base printer's inks are used.

Generally speaking, compounds of the type represented by the above structural formulas are prepared by first forming the aryl sulfonic acid diazonium salt (inner salt) and thereafter coupling the latter—generally at a relatively high pH, for example, about 10—with a suitable phenolic compound to form a corresponding azo derivative. The pH of the medium may be maintained at the desired level by the addition of ammonia, a suitable alkali metal compound or a substituted ammonium compound. In this connection, I have found that best results are generally obtained in preparing the aforesaid azo derivatives if the aryl sulfonic acid diazonium salt is reacted with the desired phenolic compound in an amount slightly less than 2 mols, for example, 1.6 to 1.75 mols, per mol of phenolic compound. Thereafter a soluble trivalent iron family metal compound such as, for example, a suitable iron or cobalt compound is next added to an aqueous solution of the aforesaid azo derivative to produce the respective metal complex thereof. To the resulting metal complex is then added a sufficient quantity of a suitable base such as, for example, pyridine to bring the pH of the mixture to a value ranging from about 4.5 to about 9.0. This step I have generally found to be desirable to produce a pigment of maximum blackness. After adjusting the pH of the mixture in the manner indicated above, a water-soluble alcohol such as—for example—methanol, tertiary butyl alcohol, isopropyl alcohol and the like is added in a quantity sufficient to effect precipitation of the pigment from the solution. In this regard, it should be pointed out that while a pigment can be secured from the reaction mixture without precipitation therefrom with alcohol, such material is frequently found not to be uniform in color. Hence, in order to insure the procurement of a pigment which is uniform both with respect to color and to quality, I ordinarily prefer to precipitate the aforesaid metal complex from solution in the manner indicated above.

In carrying out this precipitation step, using methanol as the precipitating agent, the metal complex is generally soluble in alcohol concentrations up to about 50 percent. With about 80 percent methanol, two phases are observed to appear and the pigment or dye disappears from the major part of the solution, precipitating in the form of a black tarry product. When using other water-soluble alcohols of the type specified above, the percent thereof required to effect precipitation may vary. However, the exact amount needed may be readily determined by means of a simple experiment.

In this connection it should be pointed out that the aforesaid precipitation step may be effected with any water-soluble nonelectrolyte; examples of such substances are ethyl lactate (esters), the Cellosolves (ethers), 2,5-hexanedione, acetone (ketones) and the like. Accordingly, it is to be understood that the expression "water-soluble nonelectrolyte" as used in the present description and claims is to be construed as any of a broad class of organic compounds, all of which are capable of effecting precipitation of the metal complex herein described.

The black tarry product obtained as a result of the precipitation step may be dried at a temperature of about 65° C. to give a coal-like substance which is readily soluble in water, producing an intensely black solution.

In preparing such products, phenolic compounds of the following type may be employed

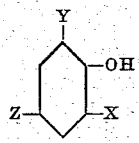

wherein Y may be —OH or —COOM″, X represents —OH or H and Z is either H or —COOM″ wherein M″ in the case of both Y and Z represents H or an alkali metal. Examples of suitable phenols included within the scope of the above formula are catechol, pyrogallol, gallic acid and salicylic acid.

Aryl amino sulfonic acids that may be used in preparing the aryl sulfonic acid diazonium salts from which the new compositions of my invention are derived are represented by the formula $NH_2$-Aryl-$SO_3H$ in which Aryl may be phenyl or naphthyl. Examples of such compounds are ortho, meta, or para amino benzene sulfonic acid and 1-aminonaphthyl-4-sulfonic acid, as well as the various other positional isomers thereof such as, for example, 1-aminonaphthyl-3-sulfonic acid and the like.

Suitable iron-family metal compounds which may be employed are ferric chloride, cobaltic chloride, freshly-prepared ferric hydroxide and the like.

My invention may be further illustrated by the following specific examples.

*Example I*

The following materials and steps are illustrative of a pilot scale manufacturing process for the production of black ink:

(1) 47 fluid ounces water.
(2) 14 ounces sulfanilic acid (para amino sulfonic acid).
(3) 7 ounces bicarbonate of soda.

Stir (1), (2) and (3) until effervescence ceases and the presence of carbon dioxide is no longer observable.

To this mixture is added
(4) 6 ounces $NaNO_2$ (sodium nitrite).
(5) Pour 16 fluid ounces of 37% aqueous hydrochloric acid on 7 pounds of crushed ice and stir.
(6) Pour the product of (4) slowly, with stirring, into the product of (5).
(7) Remove the ice, add an equal volume of water, settle, decant the clear water and save the sediment.
(8) Dissolve 3½ ounces catechol (100 grams) in 18 fluid ounces of water, add the solution to 7 pounds of crushed ice and mix the resulting product in 12 fluid ounces of 29% aqueous ammonium hydroxide.
(9) Pour the product (sediment) of (7) slowly, with stirring, into the product of (8).
(10) Remove the ice and reduce the mixture to about 170 cubic inches by evaporation at about 82° C.
(11) The product of (10) may then be filtered to remove sediment, if desired.
(12) 20 cubic centimeters of engravers' solution of ferric chloride is then added to 200 cubic centimeters of the product of (10).
(13) Pyridine may then be added dropwise to the product of (12) to produce a pH of from about 4.5 to about 9.0, developing the maximum blackness. Alternatively, ammonia may be employed in place of pyridine for the purpose of adjusting the pH of the mixture. Other alkalies such as, for example, sodium carbonate are likewise suitable.

To the resulting mixture is then added sufficient isopropyl alcohol to produce a mixture containing about 65 percent alcohol, yielding a black, tarry precipitate. The latter is recovered and dried at about 65° C. to yield a black, friable pigment. A 50 percent solution of the black dyestuff in water may be used for hectographing, producing very fine, black copies.

The black mixture produced just prior to the precipitation step described above may be employed to produce compositions suitable for recorder service by the addition of an appropriate high-boiling solvent. Thus, for example, by the addition of about 3 percent glycerin and about 6 percent tertiary butyl alcohol, a composition is produced that dries slowly and is particularly adapted for stylographic recorder service and for fingerprinting.

Ink prepared from the precipitated dyestuff may be removed from white cloth or removed from other fabrics with a dilute, e. g., 0.5 percent, hydrochloric acid solution. Removal from paper can readily be effected by use of the customary ink eradicators. Such ink is also susceptible of being contact printed because of its pronounced absorption of blue and violet light (the effect of its azo linkages) which is superimposed on the black characteristics developed by the metal ion employed. If it is desired to increase the viscosity of the ink, align derivatives or their equivalent may be added.

*Example II*

Black ink may also be produced by combining proportions of the reactants shown in the equation below under the conditions set forth in Example I. The reaction involved and the product produced are postulated to be as follows:

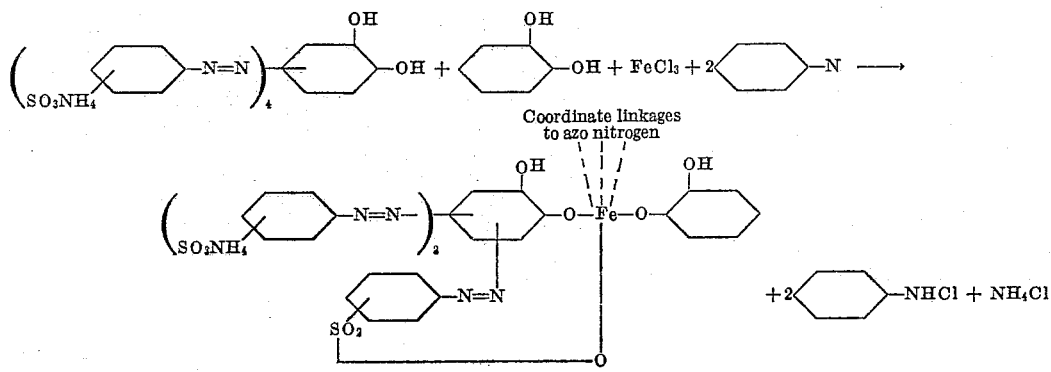

*Example III*

The conditions described in Example I are employed except that cobaltous chloride is employed as the complexing agent. The ink obtained under such conditions is dark brown, giving sharp, well-defined lines, the color of which is stable for extended periods of time.

*Example IV*

As a further example, the ink may be manufactured by mixing at 0° C. approximately 1.75 mols of para diazo benzene sulfonic acid with a solution containing 1 mol of sodium gallate and an excess of sodium bicarbonate. Photoengravers' ferric chloride solution, i. e., a 35 to 45 weight percent aqueous solution of ferric chloride, is then added stepwise until there is no further increase in color intensity. Subsequently, pyridine is added to the mixture until a pronounced odor thereof is detected. The product thus formed, when filtered, contains a uniform, water-soluble, black dye.

*Example V*

Mix equimolar quantities of catechol and meta diazo benzene sulfonic acid. Thereafter add, stepwise, an equimolar amount of sodium hydroxide in a 10 percent aqueous solution at 0° C. A precipitate having the following probable structural formula is produced:

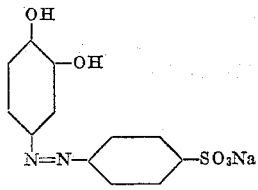

An equal number of gram mols of meta diazo benzene sulfonic acid is added to an aqueous solution prepared from the above precipitate. The mixture is then coupled at 0° C. by slowly adding an equimolar amount of sodium hydroxide in the form of a 10 percent aqueous solution. To the resulting mixture is then added photoengravers' ferric chloride solution until no further increase in color intensity is observed. Pyridine, with or without other mild alkali, is subsequently added until a trace of odor is observed. The resulting liquid may be filtered to yield black ink free of sediment.

In Examples II, IV and V the black dyestuff can be recovered in separated form by salting out with sal-ammoniac or sodium chloride in a concentrated solution of the dyestuff. In most cases, the dyestuff solutions can be concentrated by evaporation in air at 66° C. Where this is not feasible, drying in vacuo or in a stream of nitrogen can be used. The dyestuffs which are prepared to be reacted with iron may be precipitated, if desired, by adding hydrogen chloride to saturation, cold, to their concentrated solutions. This procedure drives the dyes into undissociated (un-ionized) form, which precipitates.

In the preparation of any of these examples there may be added, as required, substances adapted to alter or improve the wetting characteristics of the resulting fluid. Some alcohols which are water-soluble, pyridine, quinoline, lauryl sulfonate, are examples of materials which lower the surface tension and increase the wetting tendencies. A proprietary substance which has been tried, and which imparts these characteristics is "Victawet #14" which is believed to be butyl phosphonic acid.

From the foregoing description and examples, it will be seen that various types of black pigments and ink compositions having highly desirable characteristics can be manufactured in accordance with the process of my invention. Likewise, it will be apparent to those skilled in the art that numerous modifications of the compositions described herein may be made which employ the essential features of my invention. In general, it may be said that the scope of my invention encompasses as new compositions of matter the derivatives formed by coupling a phenolic compound of the type defined herein with an aryl aminosulfonic acid of the class referred to above, followed by complexing the resulting product with a suitable metal of the iron family.

This is a continuation-in-part of my copending application U. S. Serial No. 279,959 filed April 1, 1952, now abandoned.

I claim:

1. In a process for the preparation of a pigment suitable for the use in the preparation of ink, the improvement which comprises coupling a diazotized phenyl sulfonic acid salt with a phenolic compound selected from the group consisting of catechol, pyrogallol, gallic acid, salicylic acid and an alkali metal derivative of said acids, complexing the resulting product with a water-soluble trivalent metal compound of the iron family, thereafter adjusting the pH of the resulting mixture to a value ranging from about 4.5 to about 9.0, and forming a precipitate in said mixture by adding thereto a water-soluble organic nonelectrolite.

2. The process of claim 1 in which the pH of the mixture is adjusted by means of pyridine.

3. The process of claim 1 in which the pH of the mixture is adjusted by means of ammonia.

4. The process of claim 1 in which the complex is precipitated from the reaction mixture with a water-soluble alcohol.

5. The process of claim 1 in which methanol is the organic nonelectrolite.

6. The process of claim 1 in which isopropyl alcohol is the organic nonelectrolite employed.

7. A reaction product having the probable structural formula:

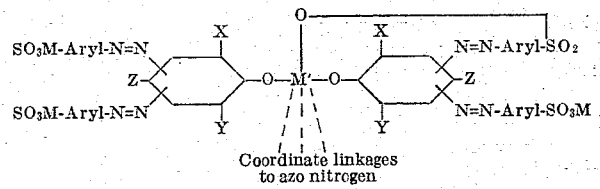

wherein Aryl is a phenyl group, X is a member of the group consisting of H and OH, M is a member selected from the group consisting of $NH_4$ and an alkali metal, M' is a metal of the iron family, Y is a member selected from the group consisting of OH and —COOM'', and Z is a member of the group consisting of H and —COOM'', wherein M'' represents a member of the group consisting of H and an alkali metal, said product having been prepared by coupling a diazotized phenyl sulfonic acid salt with a phenolic compound selected from the group consisting of catechol, pyrogallol, gallic acid, salicylic acid and an alkali metal derivative of said acids, complexing the resulting product with a water soluble trivalent metal of the iron family, thereafter adjusting the pH of the resulting mixture to a value of from about 4.5 to about 9, precipitating said reaction product from said mixture by adding thereto a water-soluble organic nonelectrolite and recovering said reaction product.

8. A black aqueous solution containing, as the principal coloring component, the reaction product of claim 7.

9. The composition of claim 7 in which the metal employed in the metallizing reaction is a trivalent iron compound.

10. The composition of claim 7 in which the complexing metal is derived from ferric chloride.

11. The composition of claim 8 in which the metal employed in the metallizing step is a water soluble trivalent iron compound.

12. The reaction product of para diazo benzene sulfonic acid and catechol complexed with trivalent iron, said product having the probable structural formula:

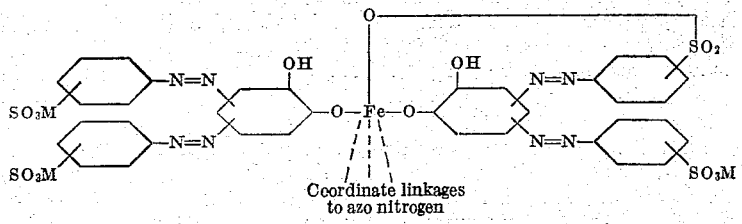

wherein M is a member selected from the group consisting of $NH_4$ and an alkali metal, said product having been prepared by coupling said sulfonic acid with catechol and then complexing the resulting product with a water soluble trivalent iron compound, adjusting the pH of the reaction mixture to a value within the range of from about 4.5 to about 9, and recovering said reaction product.

13. A black aqueous solution containing as the principal coloring component the reaction product of claim 12.

14. The reaction product of para diazo benzene sulfonic acid and sodium gallate complexed with trivalent iron, said product having the probable structural formula:

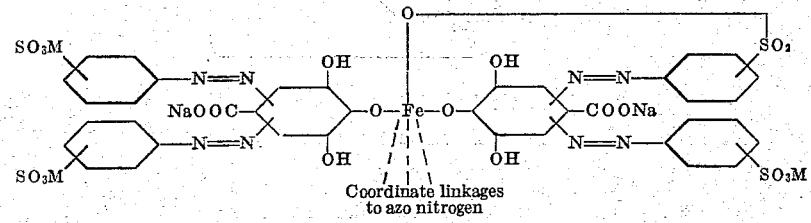

wherein M is a member selected from the group consisting of $NH_4$ and an alkali metal, said product having been prepared by coupling said sulfonic acid with sodium gallate and then complexing the resulting product with a water soluble trivalent iron compound, adjusting the pH of the reaction mixture to a value within the range of from about 4.5 to about 9, and recovering said reaction product.

References Cited in the file of this patent

UNITED STATES PATENTS

| | | |
|---|---|---|
| 1,727,468 | Kammerer | Sept. 10, 1929 |
| 2,008,602 | Straub et al. | July 16, 1935 |
| 2,008,620 | Marshall | July 16, 1935 |
| 2,052,477 | Krebser | Aug. 25, 1936 |
| 2,124,881 | Lange | July 26, 1938 |

FOREIGN PATENTS

| | | |
|---|---|---|
| 3,263 | Great Britain | of 1891 |

OTHER REFERENCES

Drew et al.: Jour. Chem. Soc. (London) (1939), I, pages 823–835 (829 and 30).